United States Patent [19]

Ozawa et al.

[11] Patent Number: 4,969,783

[45] Date of Patent: Nov. 13, 1990

[54] METHOD OF WORKING FRESNEL STEP

[75] Inventors: Yasuo Ozawa; Koichi Sakakibara; Noboru Kojima; Akira Nagakura; Seiji Igarashi, all of Shizuoka, Japan

[73] Assignee: Koito Manufacturing Co., Ltd., Tokyo, Japan

[21] Appl. No.: 334,621

[22] Filed: Apr. 7, 1989

[30] Foreign Application Priority Data

Apr. 8, 1988 [JP] Japan .................................. 63-85404
Apr. 8, 1988 [JP] Japan .................................. 63-85405

[51] Int. Cl.[5] .................................................. B23C 3/00
[52] U.S. Cl. ........................................ 409/132; 51/326
[58] Field of Search .................. 409/84, 131, 132, 123; 51/326

[56] References Cited

U.S. PATENT DOCUMENTS

| | | | |
|---|---|---|---|
| 2,831,394 | 7/1973 | Heenan et al. . | |
| 2,890,627 | 6/1959 | Onksen et al. | 409/132 |
| 3,267,279 | 8/1966 | Doolittle . | |
| 3,744,117 | 4/1958 | Heenan et al. . | |
| 4,149,304 | 4/1979 | Brynjegard | 51/326 |
| 4,198,182 | 4/1980 | Green | 409/132 |

FOREIGN PATENT DOCUMENTS

| | | | |
|---|---|---|---|
| 688297 | 10/1979 | U.S.S.R. | 409/132 |

*Primary Examiner*—Daniel W. Howell

*Attorney, Agent, or Firm*—Sughrue, Mion, Zinn, Macpeak & Seas

[57] ABSTRACT

In connection with a Fresnel lens in which concentric pitch base lines are drawn on a curved lens member at certain pitches and a number of radial partitioning lines are drawn so as to pass through the center of the concentric pitch base lines and to cross these lines so that a surface of the lens member is partitioned into a large number of arcuate Fresnel step design sections, and an angled Fresnel step is formed in each of the Fresnel step design sections so that light transmitted from a focal point of the lens at its rear side forms a substantially parallel flux of light through a refractive or reflective prism, the invention relates to the cutting of Fresnel steps in a mold element for forming the lens by causing a tool attached to a multiple axis milling cutter and having an acute point to perform reciprocating or circumferential cutting for every width of each of the inclined surfaces of said Fresnel steps while causing the tool to move radially to perform scan-cutting of the inclined surfaces. The cutting inclination angle at the point of the tool attached on said multiple spindle milling cutter may be made equal to the angle of the Fresnel step at its steep surface side. Alternatively, the tool axis may be varied during cutting to allow the tool angle to correspond to the given angle or angles of the inclined surfaces.

20 Claims, 14 Drawing Sheets

METHOD OF WORKING FRESNEL STEP

BACKGROUND OF THE INVENTION

The present invention relates to a Fresnel step machining method; that is, a machining technique for forming Fresnel steps, each constituted of a refractive system prism and a reflective system prism, on a non-flat plate, and capable of performing this function at low cost. The technique is particularly adapted to the machining of a metal workpiece which will be used as a mold in the subsequent manufacturing of actual lenses Conventionally, in a Fresnel lens in which Fresnel steps each constituted of a refractive system prism and a reflective system prism are formed on a lens member, the lens member is formed as a flat or curved plate (a spherical plate being mostly used in the latter case), as shown in FIG. 1. As shown in the case where either a flat plate or a spherical plate is used, (FIGS. 1(*a*) and 1(*b*) respectively), the configuration of the Fresnel lens is limited to a surface of revolution having an axis of rotation CL perpendicular to the face center C and coincident with the optical axis L of the Fresnel lens. In such a configuration, the Fresnel steps are formed as concentric circles with the axis of rotation CL as their center axis. In producing a metal mold for such Fresnel lenses, therefore, machining has been generally performed by turning the mold element on a lathe, and engaging the mold/workpiece with a tool fixed at a designed cutting angle.

Recently, however, lenses having complicated shapes which follow the external shapes of car bodies in order to reduce air resistance have been used for the parking lights, tail lamps and other lighting of cars and other vehicles, and lenses formed so as to have a quadratic surface or the like, with different curvatures in two directions (having no axis of rotation) have been required In the case where a Fresnel lens is to be formed with no axis of rotation, it is impossible to carry out the foregoing lathe machining technique in manufacturing the mold. Accordingly, a method has been used in which that portion having an axis of rotation and that portion having no axis of rotation are separately produced. The portion having no axis of rotation is produced by forming latticed Fresnel steps (angular direct vision steps) as shown in FIG. 2, this portion then being inserted as a core into the portion having an axis of rotation. In this three-dimensional Fresnel step machining method, however, there have been problems in that not only the number of machining steps becomes large, directly increasing machining costs, but the pitch of the Fresnel steps becomes large because of the use of a milling cutter. When the resulting Fresnel lens metal mold is used, the mold cooling properties are poor because of the core structure, so that defective moldings are apt to be generated.

SUMMARY OF THE INVENTION

The present invention solves the foregoing problems, and an object thereof is to provide a Fresnel step machining method in which three-dimensional Fresnel steps can be provided at a low cost on a lens surface such as a quadratic surface having different curvatures in two directions, for example, a lens used in the exterior lighting of a vehicle or the like.

In order to achieve the above object, in a Fresnel lens or lens mold in which concentric pitch base lines are drawn on a curved member at certain pitches, and a large number of radial partitioning lines are drawn so as to pass though a center of the concentric pitch base lines and cross the concentric pitch base lines so that the surface of the member is partitioned into a large number of arcuate Fresnel step design sections, and wherein an angled Fresnel step is formed in each of the Fresnel step design sections so that the light transmitted from a focal point of the resulting lens at its rear side will form a substantially parallel flux of light through the refractive or reflective prism action of the lens, the gist of one Fresnel step machining method according to the present invention resides in that inclined surfaces of each of the Fresnel steps are cut by causing a tool attached to a multiple axis milling cutter to perform reciprocating cutting for every width of each of the Fresnel steps, while moving the tool radially at a fine pitch to perform scan-cutting.

In the above Fresnel step machining method, it is possible for the cutting inclination angle at the point of the tool to be made equal to the angle of the Fresnel step at its steep surface side.

According to a further embodiment, in a Fresnel lens or lens mold in which concentric pitch base lines are drawn on a curved member at certain pitches and a large number of radial partitioning lines are drawn so as to pass through the center of the concentric pitch base lines and to cross the concentric pitch base lines so that a surface of the member is partitioned into a large number of arch-shaped Fresnel step design sections, and an angled Fresnel step is formed in each of the Fresnel step design sections so that the light transmitted from a focal point of the resulting lens at its rear side forms a substantially parallel light flux through the refractive or reflective prism action of the lens, the gist of another Fresnel step machining method according to the present invention resides in that when each of the Fresnel steps is cut using an acutely pointed tool attached to a multiple axis milling cutter in which the X-, Y-, and Z- directions and also the rotation and supporting angle of the tool relative to the workpiece are controlled, to perform reciprocating cutting at every width of each of the Fresnel steps and along an edge line of the Fresnel step, and an axis of the tool or workpiece is swung and moved by the milling cutter so that the tool angle of the tool coincides with the inclination angle of the inclined surface on each of the opposite sides of the edge line to thereby facilitate cutting of the vertex angle and inclined surfaces of each of the Fresnel steps.

BRIEF DESCRIPTION OF THE DRAWINGS FIGURES

DETAILED DESCRIPTION OF THE PREFERRED EMBODIMENTS

As described above, according to the present invention, arcuate Fresnel step design sections established separately from each other are cut by means of a multiple axis milling cutter. The accuracy of each of the Fresnel steps can be made higher by increasing the number of scan cutting steps for each Fresnel step, and the height of each of the Fresnel steps can be reduced by decreasing the pitch of the pitch base lines (0.3–1.5 mm). Accordingly, the moldability of a lens cover having the Fresnel lens can be improved.

Further, if the cutting inclination angle of the tool is selected to be equal to the angle of the Fresnel steps at their steep surface side, one surface can be cut by surface machining instead of reciprocating scan-cutting, so that the cutting efficiency of the surface can be improved.

Specific embodiments of the present invention will be described hereunder in accordance with various designs of Fresnel steps. Although the present invention is chiefly concerned with the machining of a Fresnel lens mold, the methods disclosed herein could be used to produce an actual lens if desired Moreover, for sake of convenience in describing certain optical effects and parameters, the invention will at times be described in terms of the lens produced by the mold machined according to the invention.

Figure 3:
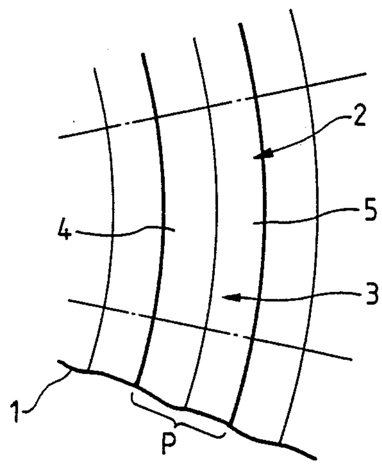
FIG. 3 is an enlarged partially cutaway front view of a lens portion showing a first example of the design of the Fresnel steps according to the present invention.
Figure 4:
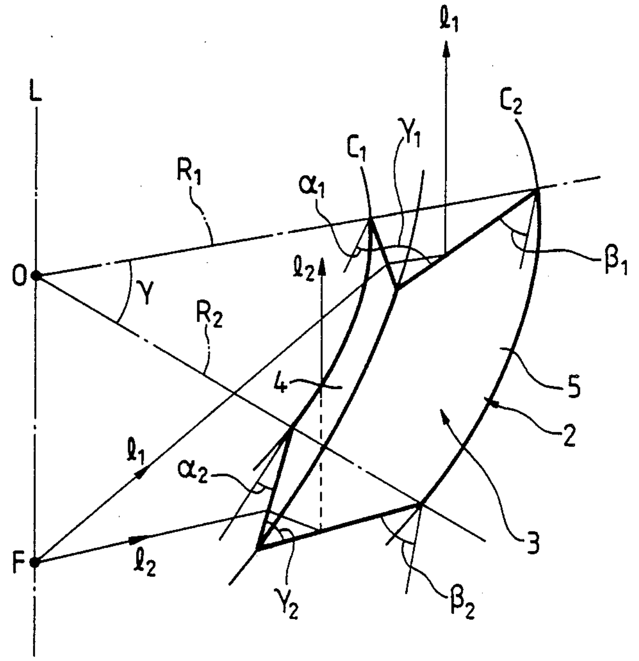
FIG. 4 is an enlarged perspective view showing the same Fresnel steps.

The Fresnel lens according to this embodiment has a configuration in which, from a fundamental Fresnel lens pattern formed as surfaces of revolution so that the axes of the surfaces of revolution perpendicular to the surface coincide with the optical axis of the lens, Fresnel steps 3 are orthographically projected onto a lens member 1 having a quadratic surface under the condition that the optical axis of the Fresnel lens coincides with the optical axis L of the lens member 1, as shown in FIGS. 3 and 4. The orthographic projection technique is a simple procedure involving mapping of a fundamental Fresnel pattern onto the quadratic surface. The technique is in itself well known and thus not further described herein. Reference is made to copending application Ser. No. 07/334,620, for an illustration of the technique. The Fresnel steps 3 are defined by concentric curves C1, C2, . . . (with the center 0) at certain pitches P, and a plurality of circumferentially angularly-equidistantly drawn radial lines R1, R2, etc. passing through the center 0 of the concentric curves Cl, C2. The sections partitioned by the concentric curves Cl, C2, . . . and the radial lines R1, R2, . . . form arcuate Fresnel step design sections 2. In each of the arcuate Fresnel step design sections 2, inclination angles $\alpha 1$ and $\alpha 2$ of the radially inward inclined surface 4 of the Fresnel step 3 at opposite ends thereof and inclination angles $\beta 1$ and $\beta 2$ of the radially outward inclined surface 5 of the same at opposite ends thereof are designed so as to create a refractive system prism or a reflective system prism which performs optical control such that light rays 1 and 2 from a focal point F on the optical axis L of the lens member 1 form light rays which pass through the Fresnel step 3 so as to become parallel to the optical axis L. The angles $\alpha 1$, $\alpha 2$, $\beta 1$ and $\beta 2$ determine the vertex angles $\gamma 1$ and $\gamma 2$ at either end of the Fresnel step 3.

Since the angles $\alpha 1$ and $\alpha 2$ and $\beta 1$ and $\beta 2$ are inclination angles with respect to the orthographic projection line, the vertex angles $\gamma 1$ and $\gamma 2$ are obtained through the following expressions:

$$\gamma 1 = \alpha 1 + \beta 1$$

$$\gamma 2 = \alpha 2 + \beta 2$$

Figure 5:
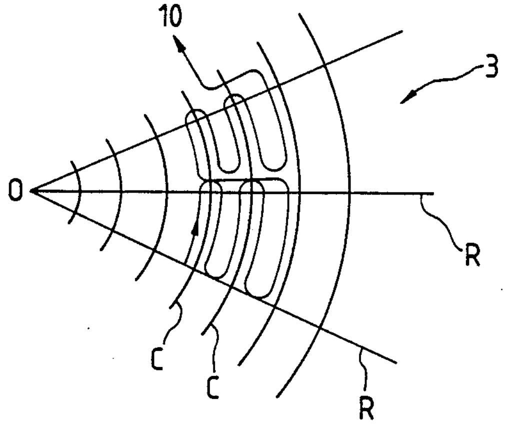
FIG. 5 is a view explaining the scan-cutting step using a multiple axis milling cutter.
Figure 6:
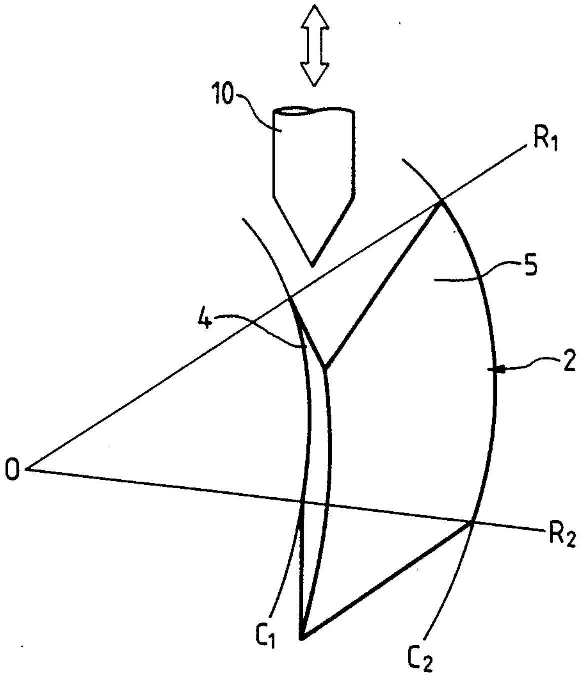
FIGS. 6 and 7 are views explaining the relation between the Fresnel steps and the tool.
Figure 7:
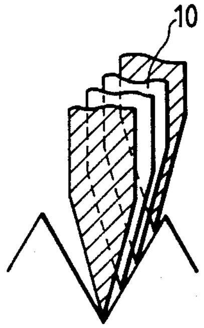

Accordingly, when the Fresnel step 3 of each of the arcuate Fresnel step design sections 2 is cut by means of a multiple axis milling cutter, in each of the arcuate Fresnel step design sections 2, a tool 10 having an acute cutting point is moved in the longitudinal direction of the Fresnel step 3 (i.e., in the circumferential direction, see FIG. 5) while performing reciprocating cutting (FIG. 7), while scanning in the radial direction with a fine scanning pitch, to thereby define the vertex angles and the inclined surfaces, as shown in FIGS. 5 through 7. To explain more fully, the tool is moved basically in a circumferential direction along the surface of the workpiece to cut the inclined surfaces of the steps one by one. The general pattern of the movement of the tool is indicated in FIG. 5, except that FIG. 5 greatly simplifies the actual tool path. In fact, the tool reciprocates back and forth in the circumferential direction as much as 50 times in cutting an inclined surface of a single step. In successive reciprocations or "passes", the tool is advanced both radially, and in the depth direction of the workpiece as schematically shown in FIG. 7, so as to gradually machine the entire inclined surface of the step. This process is referred to as "scanning" of "scan-cutting" herein, and the increment of radial movement from one pass to the next is referred to as the "scanning pitch". The quantities of change from α1 to α2 and β1 to β2 in the inclination angles of the Fresnel step 3 can be obtained by gradually changing the quantity of retreat of the tool 10 in successive scans. In this embodiment, since the steps are formed along generally, concentric lines and adjacent steps are circumferentially continuous, it is also possible if desired to cut the steps in a non-reciprocating fashion, i.e., by following the circumferential path, and adjusting the radial and depthwise positioning of the tool for successive circumferential scans.

Figure 8:
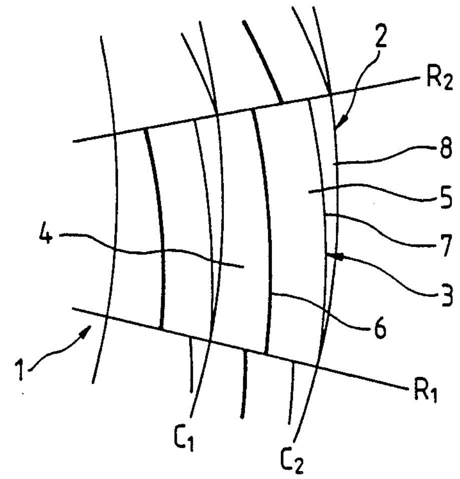
FIG. 8 is an enlarged partially cutaway front view of a lens member showing a second example of Fresnel step structure.
Figure 9:
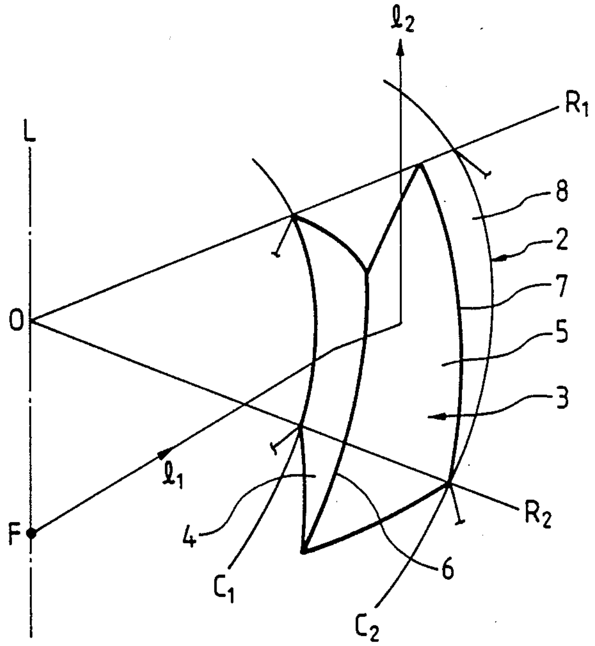
FIG. 9 is an enlarged perspective view showing the same Fresnel steps.
Figure 10A:
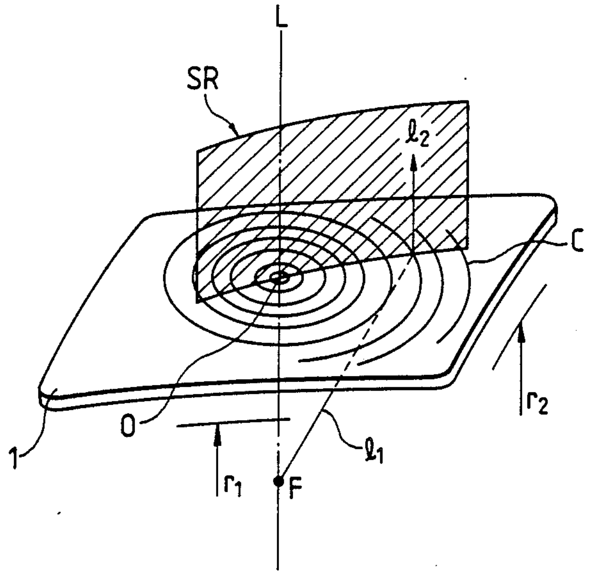
FIGS. 10 are views explaining the second example of the design of the Fresnel steps, in which FIG. 10(*a*) is a view explaining the second example, and FIG. 10(*b*) is a sectional view showing a main part of the same.
Figure 10B:
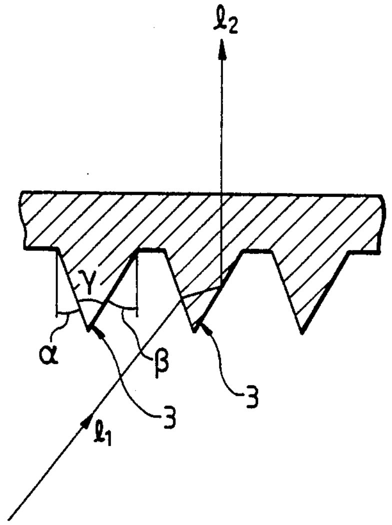
Figure 11A:
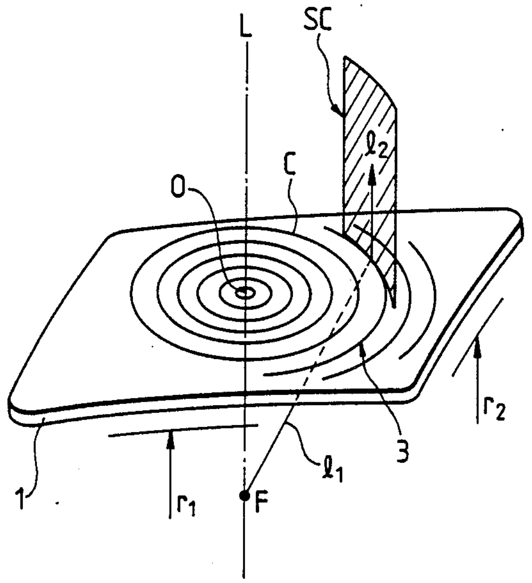
FIGS. 11 are further views explaining the second example of the design of the Fresnel steps, in which Fig. 11(*a*) is a further view explaining the second example, and FIG. 11(*b*) is a sectional view showing a main part thereof.
Figure 11B:
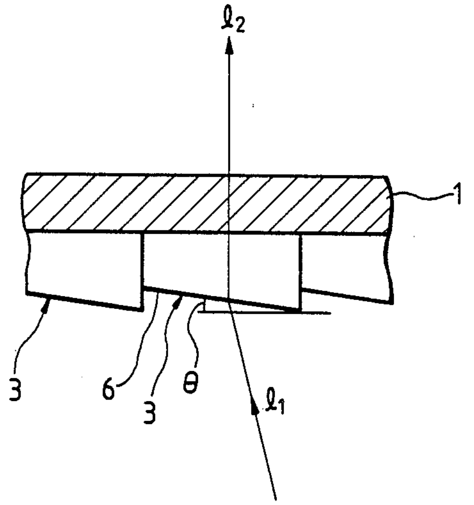

A Fresnel lens formed according to a second embodiment has a structure shown in FIGS. 8 and 9. It is constituted by a lens member 1 of quadratic surface form having curvature r1 in one direction and curvature r2 in the direction perpendicular to the first direction. The inclination angle α of the radially inside inclined surface 4 and the inclination angle β of the radially outside inclined surface 5 are designed so as to create in the lens a refractive system prism or a reflective system prism which perform optical control such that light rays 1 from a focus F on the optical axis L of the lens member 1 pass through the Fresnel step 3 so as to exit as light rays 2 which are parallel to the optical axis L in a radial sectional plane SR as shown in FIGS. 10(*a*) and 10(*b*), thereby determining the vertex angle γ of the Fresnel step 3. Moreover, the inclination angle θ with respect to the lens member 1 of a vertex portion edge line 6 is designed so that the transmitted light rays 2 remain parallel to the optical axis L and are located in a tangential plane SC in the direction of pitch base line C, with the vertex angle γ kept constant, as shown in FIGS. 11(*a*) and 11(*b*).

In this embodiment, the design is such that a flat lens portion 8 will be formed between the above-mentioned pitch base line C2 and an outside ravine line 7 formed at a ravine position of the outside inclined surface 5. This is a by-product of the constant vertex angle.

Since the angles α and β are inclination angles with respect to an orthographic projection line, the vertex angle γ satisfies the following expression.

$$\gamma=\alpha+\beta$$

Accordingly, the angles α, β and γ are fixed by this relationship.

The thus designed Fresnel lens can be obtained through reciprocating scan-cutting every arcuate Fresnel step design section 2 using a multiple axis milling cutter in the same manner as in the first embodiment. Circumferential scan cutting is also a possibility, but limited by the fact that the Fresnel steps of this embodiment are circumferentially, discontinuous. Moreover, the discontinuous design is more apt to be used in regions of high surface curvature where the concentric scanning method would be more difficult in any event.

Figure 12:
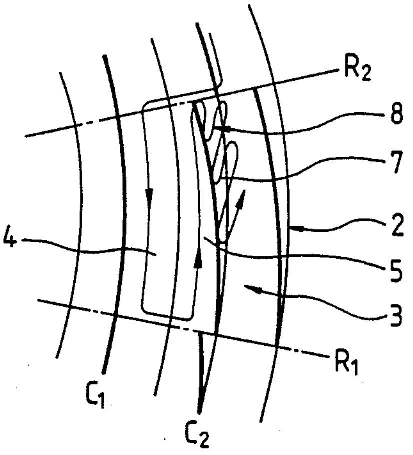
FIG. 12 through 14 are views explaining the relation between the Fresnel steps and the tool.
Figure 13:
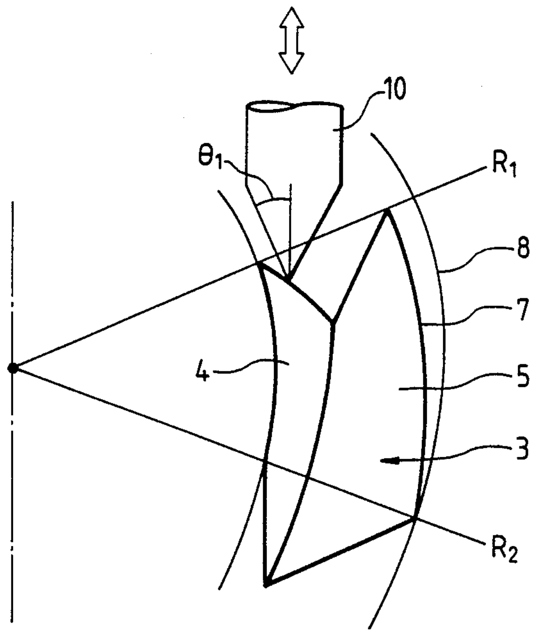
Figure 14:
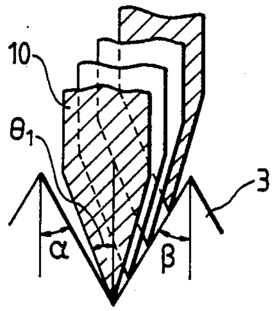

When the Fresnel step 3 of each of the arcuate Fresnel step design sections 2 is successively cut by means of the multiple axis milling cutter as shown in FIGS. 12 through 14, a tool 10 is moved to perform scan-cutting on the basis of the design of the three-dimensional Fresnel step 3 so as to obtain the inclination angle α at the inside inclined surface 4 and the inclination angle β at the outside inclined surface 5, so that the three-dimensional Fresnel step 3 is within the arcuate Fresnel step design section 2 enclosed by the concentric curved lines Cl and C2 and the radial lines R1 and R2. Scan-cutting is successively performed with respect to arcuate Fresnel step design sections 2 adjacent to the one just described.

In this case, the point of the tool 10 should have a tool angle θ, smaller than the draft angle α of the Fresnel step 3.

By performing scan-cutting scores of times for every Fresnel step 3, the inside inclined surface 4, the outside inclined surface 5, and the flat portion 8 can be cut along a locus the point of the tool 10. The path followed by the tool in scan-cutting the flat portion 8 is specifically indicated in FIG. 12; the path followed during reciprocating scan cutting is only schematically represented.

Figure 15:
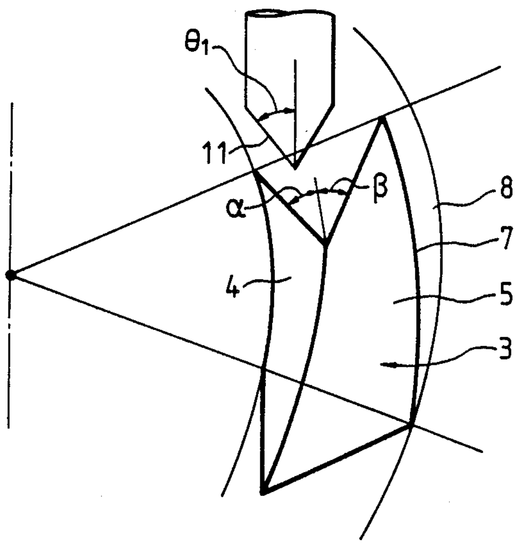
FIGS. 15 and 16 are views explaining the relation between the Fresnel steps and the tool in a third embodiment according to the present invention.
Figure 16:
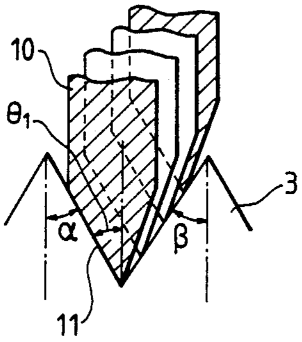

FIGS. 15 and 16 show another embodiment of the present invention in the case where the cutting of each Fresnel step 3 is performed, for example, using a tool 10 having a tool angle θ1 which is equal to the draft angle of the Fresnel step 3 in the foregoing embodiment.

That is, under the condition that the angles α, β and γ of the Fresnel step 3 are constant and fixed, the tool angle θ1 of the tool 10 is set so that the relation $\theta1=\alpha$ is satisfied where α is the draft angle. Then, as shown in FIG. 16, the inside inclined surface 4 of the Fresnel step 3 having the inclination angle α is formed by surface cutting using a cutting face 11 of the tool 10 (plural passes may still be used). The inclination angle β of the outside inclined surface 5 and the flat portion 8 are still cut by scan-cutting using the point of the tool 10 and a large number of passes. This arrangement improves the machining efficiency by permitting direct surface cutting for approximately half of the machined surface of the step 3.

With the configuration described above, the method of machining Fresnel steps according to the present invention has advantages in that the Fresnel steps can be easily cut by means of a multiple axis milling cutter even if the resultant lens member is to have a surface having different curvatures in different directions, thereby making it possible to decrease the cost of producing a Fresnel lens. When the technique is used to machine a metal Fresnel lens mold, it is possible to obtain a structure permitting superior moldability.

As described above, according to an alternative form of the present invention, the arcuate Fresnel step design sections established separately from each other are cut by means of a multiple axis milling cutter operating along concentric pitch base lines. The point of the tool is moved to perform reciprocating cutting for every width of each of the Fresnel steps along an edge line of the Fresnel step, and the inclined surface of the Fresnel step is cut using a cutting angle formed by the tool angle and the tool axis at that time. Accordingly, each of the inclined surfaces is cut with the cutting face of the tool so that it is possible to form a highly accurate lens having Fresnel steps with reduced surface roughness.

Figure 1A:
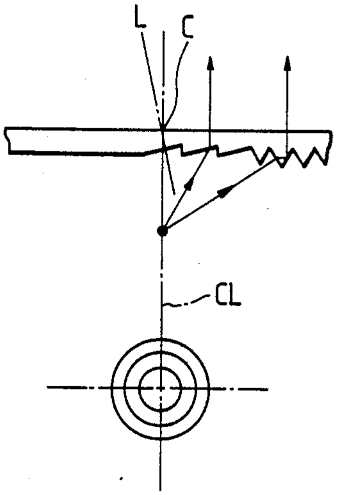
FIG. 1(a) PRIOR ART
FIGS. 1 show a Fresnel lens constituting a surface of revolution, in which FIG. 1(*a*) is a view explaining the case where the lens member is a flat plate, and FIG. 1(*b*) is a view explaining the case where a lens member is a spherical plate.
Figure 1B:
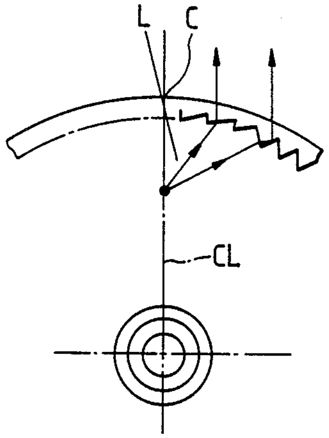
FIG. 1(b) PRIOR ART
Figure 2:
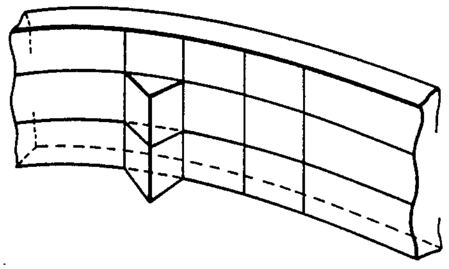
FIG. 2 PRIOR ART
FIG. 2 is a perspective view showing the main part of latticed Fresnel steps.
Figure 17:
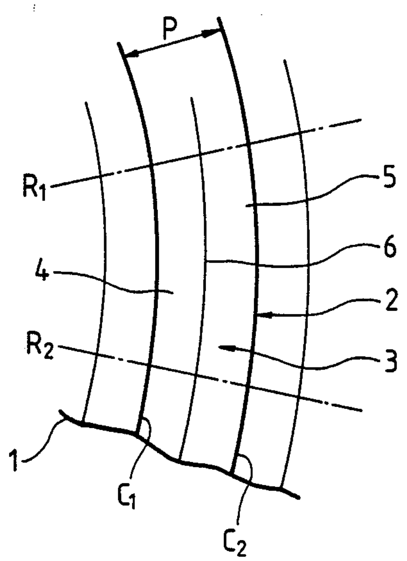
FIG. 17 is an enlarged partially cutaway front view of the lens portion showing the design of the Fresnel steps according to the present invention.
Figure 18:
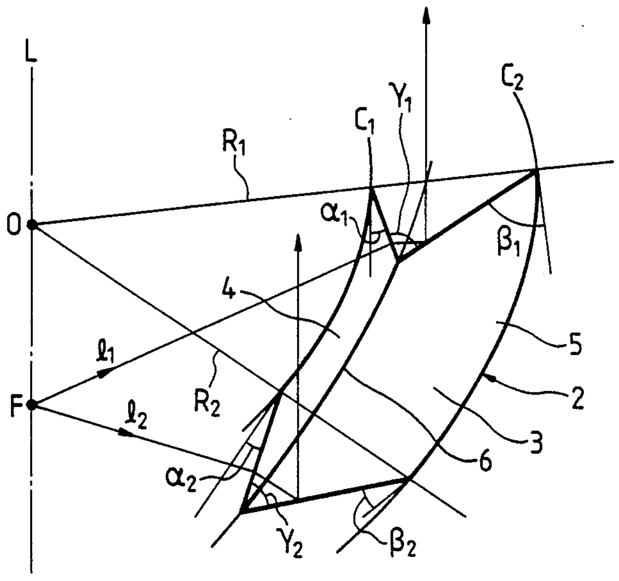
FIG. 18 is an enlarged perspective view showing the same Fresnel steps.
Figure 19:
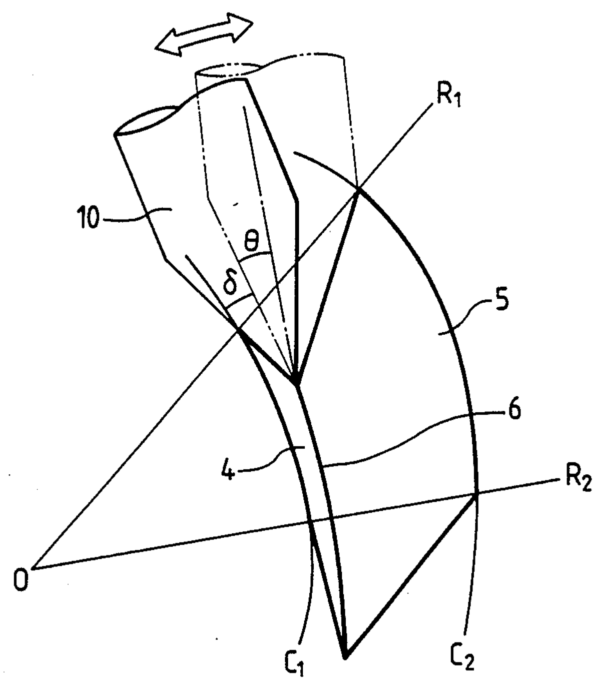
FIGS. 19 and 20 are views explaining the relation between the Fresnel steps and the tool when a 5-axis milling machine is used.
Figure 20:
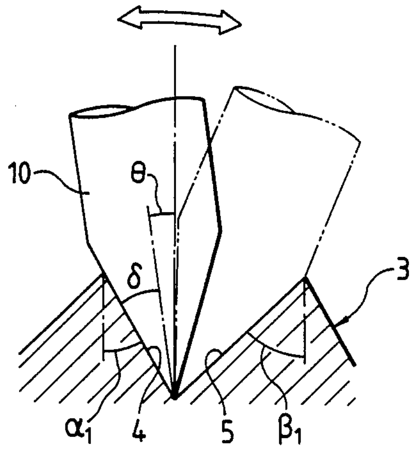

The Fresnel lens formed according to a fourth embodiment has a configuration in which, as in FIGS. 1 and 2, a fundamental Fresnel lens pattern formed as a shape of revolution is orthographically mapped onto a quadratic surface under the condition that the optical axis of the Fresnel lens coincides with the optical axis L of the lens member 1, as shown in FIGS. 17 and 18. The Fresnel steps 3 are defined by concentric curved lines Cl, C2, . . . (with the center 0) at certain pitches P and a plurality of circumferentially angularly-equidistantly drawn radial lines R1 passing through the center 0 of the concentric lines Cl, C2. The sections partitioned by the concentric lines Cl, C2, . . . form arcuate Fresnel step design sections 2. In each of the arcuate Fresnel step design sections 2, inclination angles $\alpha 1$ and $\alpha 2$ of the radially inside inclined surface 4 of the Fresnel step 3 at the opposite ends thereof and inclination angles $\beta 1$ and $\beta 2$ of the outside inclined surface 5 at the opposite ends thereof are designed so as to constitute a refractive or reflective prism which performs optical control such that light rays 1 and 2 from a focus F on the optical axis L of the lens member 1 form light rays passing through the Fresnel step 3 so as to be parallel to the optical axis L, to thereby determine vertex angles $\gamma 1$ and $\gamma 2$ of the Fresnel step 3.

Since $\alpha 1$ and $\alpha 2$ and $\beta 1$ and $\beta 2$ are inclination angles with respect to the orthographic projection line, the vertex angles $\gamma 1$ and $\gamma 2$ are obtained through the following expressions:

$$\gamma 1=\alpha 1+\beta 1$$

$$\gamma 2=\alpha 2+\beta 2$$

Accordingly, when the Fresnel step 3 of each of the arcuate Fresnel step design partitions 2 is cut by means of a multiple axis, e.g. 5 axis milling cutter, in each of the arcuate Fresnel step design partitions 2, a tool 10 having an acute point is moved in the longitudinal direction of the Fresnel step 3, (in the circumferential direction) to perform reciprocating or circumferential non-reciprocating cutting. That is, cutting is performed by moving the point of the tool 10 along the edge line 6 while the relative supporting angle $\theta$ of the tool axis is gradually changed from $\theta 1$ to $\theta 2$ or from $\theta' 1$ to $\theta' 2$ in accordance with the quantity of change of the inclination angle of the Fresnel step 3 from $\alpha 1$ to $\alpha 2$ or from $\beta 1$ to $\beta 2$ respectively. At this time, the tool angle $\gamma$ is of course constant, and therefore the tool axis is relatively controlled so that the following relation is satisfied:

$$\alpha n=\delta+\theta n$$

$$\beta n=\delta+\theta n$$

Figure 21:
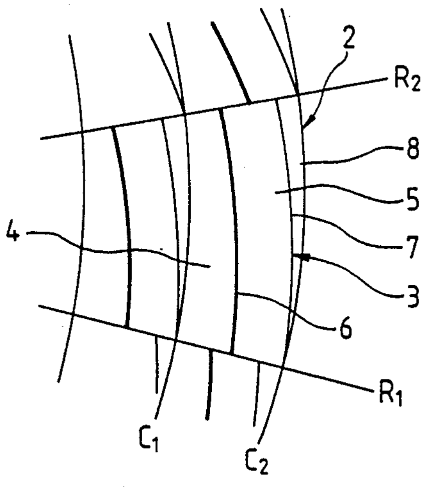
FIG. 21 is an enlarged partially cutaway front view of the lens member showing another example of the Fresnel step structure.
Figure 22:
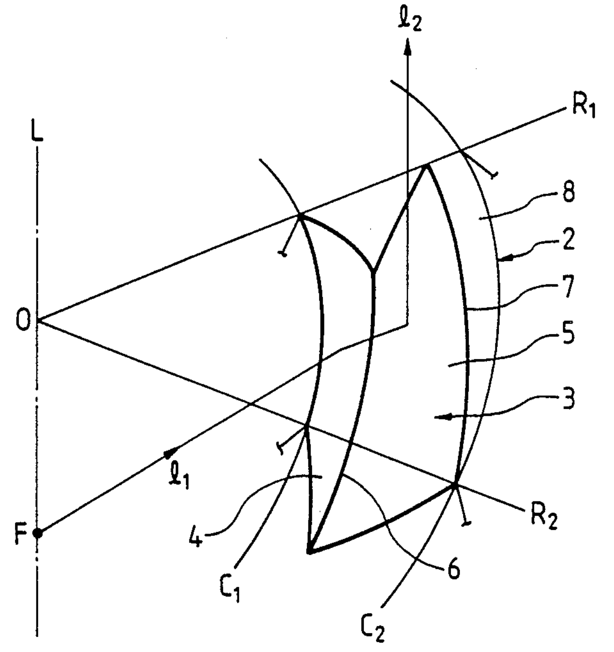
FIG. 22 is an enlarged perspective view showing the same Fresnel steps.
Figure 23A:
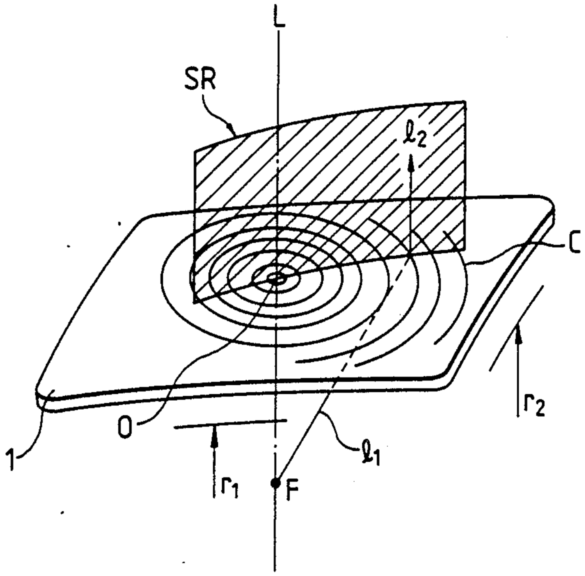
FIGS. 23 are views explaining a further example of the design of the Fresnel steps, in which FIG. 23(*a*) is a view explaining this example, and FIG. 23(*b*) is a sectional view showing the main part of the same.
Figure 23B:
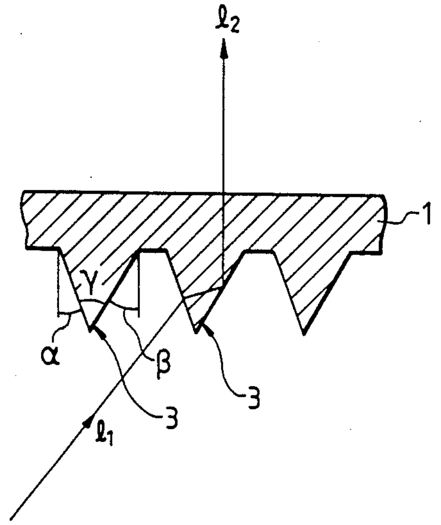
Figure 24A:
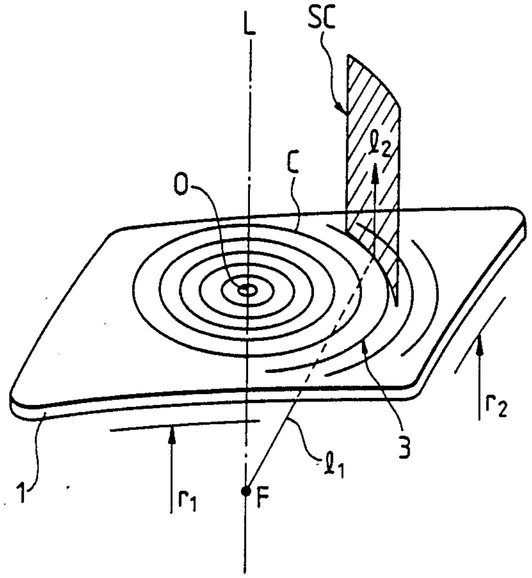
FIGS. 24 are views further explaining the design of FIG. 23, in which FIG. 24(*a*) is a view explaining this example, and FIG. 24(*b*) is a sectional view showing the main part thereof.
Figure 24B:
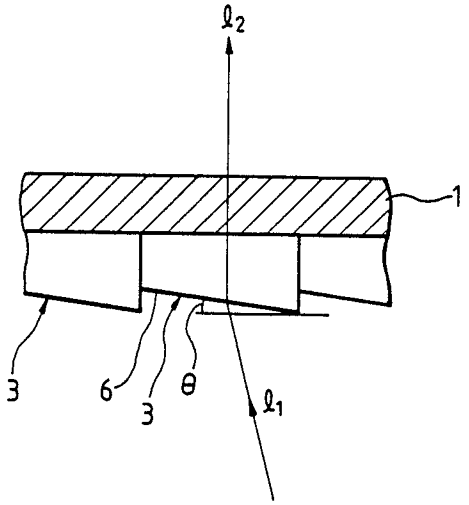

According to this embodiment, advantage is thus taken of the fact that a 5-axis milling machine allows for variation in the relative inclination or attitude of the tool with respect to the work. In an embodiment wherein the steps are continuously formed, cutting can proceed using the circumferential surface cutting technique. Scanning is still performed to more precisely cut the surface, but the number of scans is far less than that needed when using a 3-axis machine, where surface tool engagement is generally not possible The Fresnel lens made according to a further embodiment has a structure shown in FIGS. 21 and 22, which is constituted by a lens member 1 of a quadratic surface having a curvature r1 in one direction and curvature r2 in the direction perpendicular to the first direction. The inclination angle $\alpha$ of the inside inclined surface 4 and the inclination angle $\beta$ of the outside inclined surface 5 are designed so as to constitute a refractive or reflective prism, to perform optical control such that light rays 1 from a focus F on the optical axis L of the lens member 1 pass through a central portion of the Fresnel step 3 so as to become parallel to the optical axis L in a radial sectional plane SR as shown in FIGS. 23(*a*) and 23(*b*), thereby determining the vertex angle $\gamma$ of the Fresnel step 3. Next, the inclination angle $\theta$ of a vertex portion edge line 6 with respect to the lens member 1 is designed so that the transmitted light rays 2 are parallel to the optical axis L in a tangential plane SC in the direction of a pitch base line C with the vertex angle $\gamma$ kept constant, as shown in FIGS. 24(*a*) and 24(*b*).

The design is such that, as in FIGS. 8 and 9, a flat portion 8 is formed between the above-mentioned pitch base line C2 (FIG. 22) and an outside ravine line 7 formed at a ravine position of the outside inclined surface 5.

Since the angles $\alpha$ and $\beta$ are inclination angles with respect to an orthographic projection line, the vertex angle $\gamma$ is obtained through the following expression:

$$\gamma=\alpha+\beta$$

Accordingly, the angles $\alpha$, $\beta$ and $\gamma$ are relatively fixed.

The thus designed Fresnel lens can be obtained using a 5-axis milling machine by face-cutting (surface cutting) the inside inclined surface 4 and the outside inclined surface 5 with the cutting face of the tool 10. The flat lens portion 8 is scanningly cut with the point of the tool 10, for every arcuate Fresnel step design section 2, by means of the multiple axis milling cutter, in the same manner as in the preceding embodiment.

Figure 25:
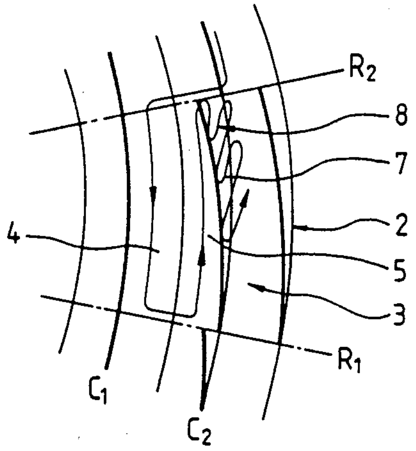
FIGS. 25 through 27 are views for explaining the relation between the Fresnel steps and the tool when a 5-axis machine is used.
Figure 26:
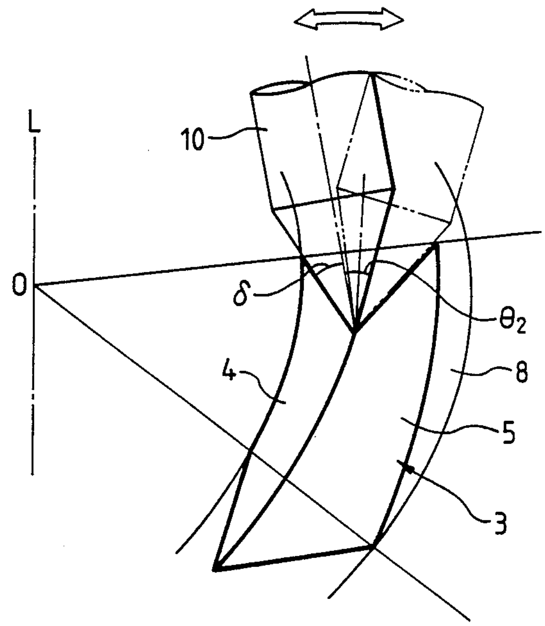
Figure 27:
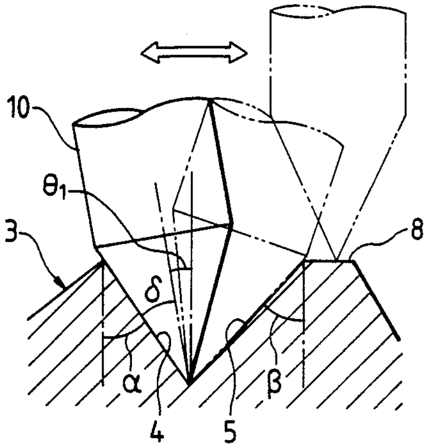

When the Fresnel step 3 of each of the arcuate Fresnel step design sections 2 is successively cut by means of the multiple (5-axis) milling cutter as shown in FIGS. 25 through 27, the point of the tool 10 is moved along the edge line 6 within the arcuate Fresnel step design section 2 with the tool axis relatively inclined at the inclination angle $\theta 1$ so as to satisfy the relation $$\alpha=\delta+\theta 1$$

with respect to the inclination angle $\alpha$ of the inside inclined surface 4.

Next, the point of the tool 10 is moved along the edge line 6 within the arcuate Fresnel step design section 2 under the condition that the tool axis is inclined at the inclination angle $\theta 2$ so as to satisfy the relation $$\beta=\delta+\theta 2$$

with respect to the inclination angle $\beta$ of the outside inclined surface 4.

By this movement, the inclined surfaces 4 and 5 are respectively cut by the cutting face of the tool 10.

Then, the tool is moved to scan-cut the portion to form the flat lens portion 8 under the condition that the inclination angle $\theta$ is kept zero, to cut the flat lens portion 8 with the point of the tool 10 (FIG. 27). As described in the preceding embodiment, it may be necessary or advantageous to cut the inclined surfaces using a scan-cutting technique, with the number of scans being small.

The method of machining Fresnel steps according to the latter described embodiments of present invention have advantages in that Fresnel steps having a three-dimensional structure can be easily cut by means of a multiple axis (5-axis) milling cutter even if the lens member has a quadratic surface, thereby making it possible to decrease the cost of machining a Fresnel lens, and in that surface cutting can be performed with the face of the tool, making it possible to efficiently obtain a highly accurately machined face.

Further, according to the present invention, even where the thus cut Fresnel step structure is used as a mold without further processing, it is possible to obtain a structure superior in moldability.

What is claimed is:

1. A method of producing a mold for a Fresnel lens of the type having differing curvature in differing directions, comprising;

(a) defining a plurality of Fresnel step design sections, each section being bounded by concentric pitch base lines defined on a curved surface and radial partitioning lines passing though the center of said concentric pitch base lines and crossing said concentric pitch base lines;

(b) moving a machining tool over a workpiece to cut therein at least two intersecting inclined surfaces of a Fresnel step defined within each design section, said inclined surfaces having varying inclinations at different points thereon, the intersection of said inclined surfaces defining a vertex angle of variable value, by reciprocating said tool while a point of said tool engages one of said inclined surfaces, and radially moving said tool with a fine pitch until the inclined surfaces are completely machined to a desired shape.

2. The method as claimed in claim 1, wherein a distance through which said tool is moved away from said workpiece during said step of reciprocating is varied with the radial position of said tool.

3. A method of producing a mold for a Fresnel lens of the type having differing curvature in differing directions, comprising;

(a) defining a plurality of Fresnel step design sections, each section being bounded by concentric pitch base lines defined on a curved surface and radial partitioning lines passing though the center of said concentric pitch base lines and crossing said concentric pitch base lines;

(b) moving a machining tool to cut at least two intersecting inclined surfaces defined within each design section, said inclined surfaces defining a vertex angle, at least one of said surfaces being cut by circumferentially reciprocating said tool while a point of said tool engages said inclined surface, and stepping said tool in a direction radially of said Fresnel step design section with a fine pitch during said reciprocation, to machine the entire area of said surface.

4. The method as claimed in claim 3, wherein said vertex angle is a constant within each Fresnel step design section, and wherein said machining tool further machines a flat section located between the termination of one of said inclined surfaces and an adjacent concentric pitch line.

5. The method as claimed in claim 1, wherein plural ones of said Fresnel design sections are continuous with one another in a circumferential direction of said mold, and wherein said machining tool travels to an adjacent Fresnel design section after completing machining of the Fresnel step in a first Fresnel design section.

6. The method as claimed in claim 3, wherein said tool is formed with a tool angle equal to the inclination angle of the other of said inclined surfaces, and is moved to machine said other of said inclined surfaces via surface engagement with a cutting surface of said tool.

7. The method as claimed in claim 3, wherein plural ones of said Fresnel design sections are continuous with one another in a circumferential direction of said mold, and wherein said machining tool travels to an adjacent Fresnel design section after completing machining of the Fresnel step in a first Fresnel design section.

8. The method as claimed in claim 4, wherein said tool is formed with a tool angle equal to the inclination angle of the other of said inclined surfaces, and is moved to machine said other of said inclined surfaces via surface engagement with a cutting surface of said tool.

9. The method as claimed in claim 4, wherein circumferentially adjacent ones of said Fresnel design sections are formed to have respective inclined surfaces which are discontinuous with one another in a circumferential direction of said mold.

10. The method as claimed in claim 9, wherein said tool is moved to cut said inclined surfaces such that the height of said inclined surfaces varies in a continuous and smooth manner without abrupt transitions within each Fresnel step design section.

11. A method of producing a mold for a Fresnel lens of the type having differing curvature in differing directions, comprising;

(a) defining a plurality of Fresnel step design sections, each section being bounded by concentric pitch base lines defined on a curved surface and radial partitioning lines passing though the center of said concentric pitch base lines and crossing said concentric pitch base lines;

(b) moving a machining tool to cut at least two intersecting inclined surfaces of a Fresnel step defined within each design section, said two inclined surfaces forming a non-constant vertex angle, by engaging a point of said tool with one of said inclined surfaces and moving said tool circumferentially from one Fresnel step design section to the next along a continuous path bounded by said concentric pitch lines, and radially stepping said tool to engage another portion of said inclined surface until said inclined surface and all circumferentially continuous inclined surfaces of circumferentially continuous Fresnel step design sections have been machined to a desired configuration.

12. A method of producing a mold for a Fresnel lens of the type having differing curvature in differing directions, comprising;

(a) defining a plurality of Fresnel step design sections, each section being bounded by concentric pitch base lines defined on a curved surface and radial partitioning lines passing though the center of said concentric pitch base lines and crossing said concentric pitch base lines;

(b) moving a tool mounted on a multiple axis milling apparatus to engage and cut at least two intersecting inclined surfaces of a Fresnel step defined within each design section, said two inclined surfaces defining a vertex angle, by relatively, moving said tool and said design section such that the relative inclination of said tool matches the desired inclination of the inclined surface then being cut, and radially moving said tool to engage different sections of said inclined surface during different traverses of said inclined surface.

13. The method as claimed in claim 12, wherein said vertex angle varies from point to point along the intersection of said inclined surfaces.

14. The method as claimed in claim 12, wherein said vertex angle is constant within each said design section.

15. The method as claimed in claim 14, wherein the inclined surfaces of a first design section are substantially discontinuous with the inclined surfaces of a circumferentially adjacent design section.

16. The method as claimed in claim 15, and further comprising the step of scan-cutting a flat surface defined between one of said concentric pitch base lines and one of said inclined surfaces, within each design section.

17. The method as claimed in claim 12, wherein each of said inclined surfaces is cut by reciprocatingly moving said tool along the surface of each said inclined surface while radially stepping said tool until said inclined surface is completely machined, and subsequently moving said tool into contact with an inclined surface of a subsequent design section.

18. The method as claimed in claim 12, wherein each of said inclined surfaces is cut by continuously moving said tool along an at least generally circumferential path, to cut circumferentially aligned inclined surfaces of a sequence of design sections before returning to an originating design section.

19. The method as claimed in claim 15, wherein each of said inclined surfaces is cut by reciprocatingly moving said tool along the surface of each said inclined surface while radially stepping said tool until said inclined surface is completely machined, and subsequently moving said tool into contact with an inclined surface of a subsequent design section.

20. The method as claimed in claim 15, wherein each of said inclined surfaces is cut by continuously moving said tool along an at least generally circumferential path, to cut circumferentially aligned inclined surfaces of a sequence of design sections a before returning to an originating design section.

* * * * *